United States Patent
Varady et al.

(10) Patent No.: US 9,221,465 B2
(45) Date of Patent: Dec. 29, 2015

(54) ROUGH ROAD DETECTION AND MISFIRE CONTROL

(71) Applicants: Arthur J. Varady, Chelsea, MI (US); Patrick J. Kohler, Jerome, MI (US); Johnathan M. Swanson, Washington, MI (US)

(72) Inventors: Arthur J. Varady, Chelsea, MI (US); Patrick J. Kohler, Jerome, MI (US); Johnathan M. Swanson, Washington, MI (US)

(73) Assignee: FCA US LLC, Auburn Hills, MI (US)

( * ) Notice: Subject to any disclaimer, the term of this patent is extended or adjusted under 35 U.S.C. 154(b) by 314 days.

(21) Appl. No.: 14/032,807

(22) Filed: Sep. 20, 2013

(65) Prior Publication Data

US 2015/0088368 A1 Mar. 26, 2015

(51) Int. Cl.
*G01M 15/11* (2006.01)
*G01M 15/04* (2006.01)
*B60W 10/06* (2006.01)
*B60W 40/06* (2012.01)

(52) U.S. Cl.
CPC ........... *B60W 40/06* (2013.01); *B60W 2520/28* (2013.01); *F02D 2200/1015* (2013.01); *F02D 2200/702* (2013.01)

(58) Field of Classification Search
CPC ............................. G01M 15/11; G01M 15/042
See application file for complete search history.

(56) References Cited

U.S. PATENT DOCUMENTS

| | | | |
|---|---|---|---|
| 5,544,521 A | 8/1996 | McCombie | |
| 5,717,133 A * | 2/1998 | Wu | G01M 15/11 123/436 |
| 5,862,507 A * | 1/1999 | Wu | F02D 41/1498 701/111 |
| 6,314,802 B1 * | 11/2001 | Wu | G01M 15/11 123/436 |
| 6,799,453 B2 | 10/2004 | Miyauchi et al. | |
| 7,950,273 B2 | 5/2011 | Assaf et al. | |
| 8,060,275 B2 | 11/2011 | Asgari et al. | |
| 2008/0177437 A1 * | 7/2008 | Asgari | B60W 50/0205 701/31.7 |
| 2009/0088956 A1 * | 4/2009 | Lin | B60Q 9/00 701/111 |

* cited by examiner

*Primary Examiner* — Jerrah Edwards
*Assistant Examiner* — Paul Castro
(74) *Attorney, Agent, or Firm* — Ralph E. Smith

(57) ABSTRACT

Computer-implemented techniques include determining, at a controller of a vehicle, a wheel speed for each of two front wheels of the vehicle and two rear wheels of the vehicle. The techniques include calculating, at the controller, a difference between (i) an average of the wheel speeds for the two front wheels of the vehicle and (ii) an average of the wheel speeds for the two rear wheels of the vehicle to obtain an error. The techniques include setting, at the controller, a rough road detection bit when the error is greater than or equal to a threshold indicative of an error corresponding to rough road. The techniques include monitoring, at the controller, the rough road detection bit for a period to obtain a hysteresis band. The techniques also include determining, at the controller, whether the vehicle is traveling on rough road based on the hysteresis band.

20 Claims, 4 Drawing Sheets

ROUGH ROAD DETECTION AND MISFIRE CONTROL

FIELD

The present disclosure relates generally to vehicle diagnostic systems and, more particularly, to techniques for rough road detection and engine misfire control.

BACKGROUND

A vehicle can include an internal combustion engine that generates drive torque. The drive torque can be transferred to a drivetrain of the vehicle (a drive shaft, a differential, one or more wheels, etc.) via a transmission. When the vehicle is traveling on a rough road, the disturbance to the drivetrain can affect other components of the vehicle. One component that can be affected by rough road disturbance is a crankshaft of the internal combustion engine. More specifically, a crankshaft sensor may detect rough road disturbance in a rotational profile of the crankshaft, which may then be incorrectly diagnosed as a misfire of the internal combustion engine.

SUMMARY

In one form, a method is provided in accordance with the teachings of the present disclosure. The method can include determining, at a controller of a vehicle, the controller including one or more processors, a wheel speed for each of two front wheels of the vehicle and two rear wheels of the vehicle. The method can include calculating, at the controller, a difference between (i) an average of the wheel speeds for the two front wheels of the vehicle and (ii) an average of the wheel speeds for the two rear wheels of the vehicle to obtain an error. The method can include setting, at the controller, a rough road detection bit when the error is greater than or equal to a threshold indicative of an error corresponding to rough road. The method can include monitoring, at the controller, the rough road detection bit for a period to obtain a hysteresis band. The method can also include determining, at the controller, whether the vehicle is traveling on rough road based on the hysteresis band.

In another form, a method is provided in accordance with the teachings of the present disclosure. The method can include determining, at a controller of a vehicle, the controller including one or more processors, signals indicative of wheel speeds for each of four wheels of the vehicle from respective wheel speed sensors, the four wheels of the vehicle including two front wheels and two rear wheels. The method can include validating, at the controller, the signals as being (i) accurate and (ii) having been generated by the wheel speed sensors within a previous predetermined period. The method can include scaling, at the controller, the signals to increase a resolution of each of the signals in response to the signals being validated. The method can include calculating, at the controller, a difference between (i) an average of the signals for the two front wheels of the vehicle and (ii) an average of the signals for the two rear wheels of the vehicle to obtain an error. The method can include calculating, at the controller, an absolute value of the error to obtain a modified error. The method can include applying, at the controller, an adjustable gain to the modified error to obtain a first adjusted error. The method can include applying, at the controller, a low-pass filter to the first adjusted error to obtain a filtered error. The method can include adjusting, at the controller, the filtered error to compensate for any offset between (i) the signals for the two front wheels and (ii) the signals for the two rear wheels to obtain a second adjusted error. The method can include applying, at the controller, the cube law to the second adjusted error to obtain a final error. The method can include setting, at the controller, a rough road detection bit when the final error is greater than a threshold indicative of an error corresponding to rough road. The method can include monitoring, at the controller, the rough road detection bit for a period to obtain a hysteresis band. The method can also include determining, at the controller, whether the vehicle is traveling on rough road based on the hysteresis band.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously mentioned, when a vehicle is traveling on a rough road, the disturbance to the drivetrain can affect a rotational profile of a crankshaft of an internal combustion engine of the vehicle. This disturbance may then be incorrectly diagnosed as a misfire of the internal combustion engine. Diagnostic systems, therefore, may attempt to validate detected misfires by determining whether detected misfires are actual misfires or false misfires due to the rough road disturbance. For example, diagnostic systems may monitor parameters such as a rotational speed of the crankshaft and/or a rotational speed of an output shaft of a transmission of the vehicle in order to validate detected misfires. These parameters, however, may not provide for accurate validation of detected misfires because these parameters do not accurately reflect the rough road surface that the vehicle is traveling on.

Accordingly, techniques are presented for improved rough road detection and engine misfire control. The techniques can include determining, at a controller of a vehicle, the controller including one or more processors, a wheel speed for each of two front wheels of the vehicle and two rear wheels of the vehicle. The techniques can include calculating, at the controller, a difference between (i) an average of the wheel speeds for the two front wheels of the vehicle and (ii) an average of the wheel speeds for the two rear wheels of the vehicle to obtain an error. In some implementations, additional processing of the wheel speed signals and/or the error can be performed.

The techniques can include setting, at the controller, a rough road detection bit when the error is greater than or equal to a threshold indicative of an error corresponding to rough road. The techniques can include monitoring, at the controller, the rough road detection bit for a period to obtain a hysteresis band. The techniques can also include determining, at the controller, whether the vehicle is traveling on rough road based on the hysteresis band. In some implementations, additional functions can be performed based on the hysteresis band, such as detected misfire validation, accelerometer validation, and/or engine torque control.

Figure 1:
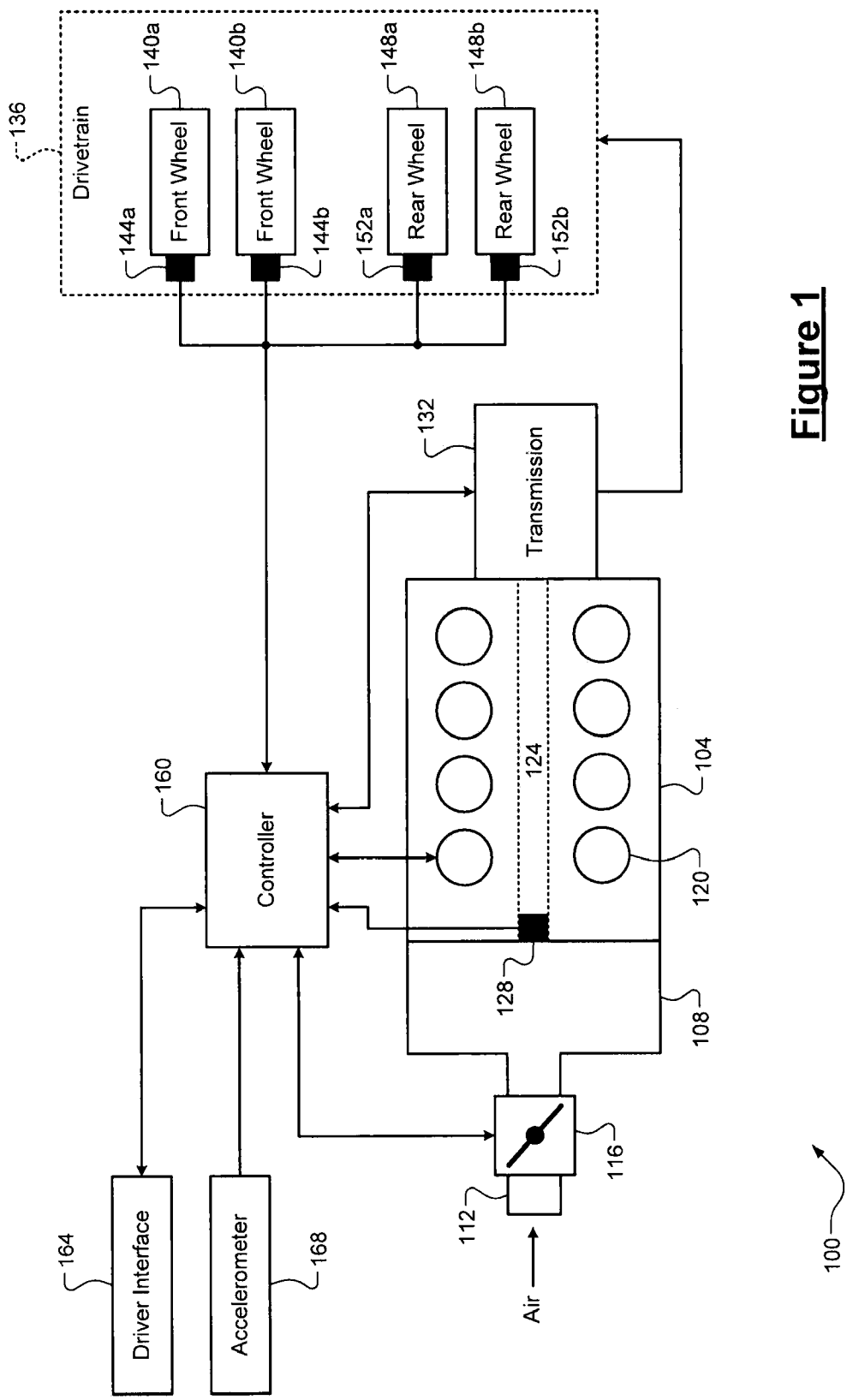
FIG. 1 is a diagram of an exemplary vehicle according to the principles of the present disclosure.

Referring now to FIG. 1, an exemplary vehicle 100 is illustrated. The vehicle 100 can be propelled by drive torque generated by a prime mover, such as an internal combustion engine 104 (hereinafter "engine 104"). It should be appreciated that the vehicle 100 can also include other drive torque generating sources such as an electric motor. The engine 104 can draw air into an intake manifold 108 through an induction system 112 that is regulated by a throttle 116. The air in the intake manifold 108 is distributed to a plurality of cylinders 120 (hereinafter "cylinders 120") and combined with fuel, e.g., from fuel injectors, to create an air/fuel mixture. While eight cylinders are illustrated, the engine 104 can have other numbers of cylinders.

The air/fuel mixture is compressed by pistons (not shown) within the cylinders 120 and ignited by a spark, e.g., from spark plugs. The combustion of the compressed air/fuel mixture drives the pistons, which rotatably turn a crankshaft 124 to generate drive torque. A crankshaft speed sensor 128 can measure a rotational speed of the crankshaft 124. The rotational speed of the crankshaft 124 over a period can be referred to as a rotational profile of the crankshaft 124. The drive torque can be transferred from the crankshaft 124 via a transmission 132 to a drivetrain 136. Exhaust gas resulting from combustion can be expelled from the cylinders 120 into an exhaust system (not shown) that can treat the exhaust gas before it is released into the atmosphere.

The drivetrain 136 can include front wheels 140a and 140b (collectively "front wheels 140"). Front wheel speed sensors 144a and 144b (collectively "front wheel speed sensors 144") can measure rotational speeds of front wheels 140a and 140b, respectively. The drivetrain can also include rear wheels 148a and 148b (collectively "rear wheels 148"). Rear wheel speed sensors 152a and 152b (collectively "rear wheel speed sensors 152") can measure rotational speeds of rear wheels 148a and 148b, respectively. It should be appreciated that the drivetrain 136 can also include other suitable components for distributing the drive torque to one or more of the front wheels 140 and the rear wheels 148.

A controller 160 can control operation of the vehicle 100. The controller 160 can control the drive torque generated by the engine 104 by controlling the throttle 116 and/or the cylinders 120 (fuel and/or spark). The controller 160 can also control the transmission 132. The controller 160 can receive signals from the crankshaft speed sensor 128, the front wheel speed sensors 144, and the rear wheel speed sensors 152. The controller 160 can also communicate with a driver interface 164. The driver interface 164 can include any suitable components for interfacing with a driver of the vehicle 100 (an accelerator pedal, gauges, indicator lights, a display, etc.).

The controller 160 can also receive a signal from one or more accelerometers 168 (hereinafter "accelerometer 168"). For example, the accelerometer 168 may be a seat accelerometer. In one implementation, the accelerometer 168 can be used to determine aeration of engine oil. It should be appreciated, however, that other accelerometer implementations can be used and/or the accelerometer(s) can be used for other features. For example, when engine oil aeration is detected, an electro-hydraulic variable valve actuation system controlling air intake (without a throttle valve) can be held at lock pin. The rough road detection techniques of the present disclosure can be used to validate the accelerometer 160, i.e., to verify that the accelerometer 160 is generating accurate measurements, which is described in more detail below.

Figure 2:
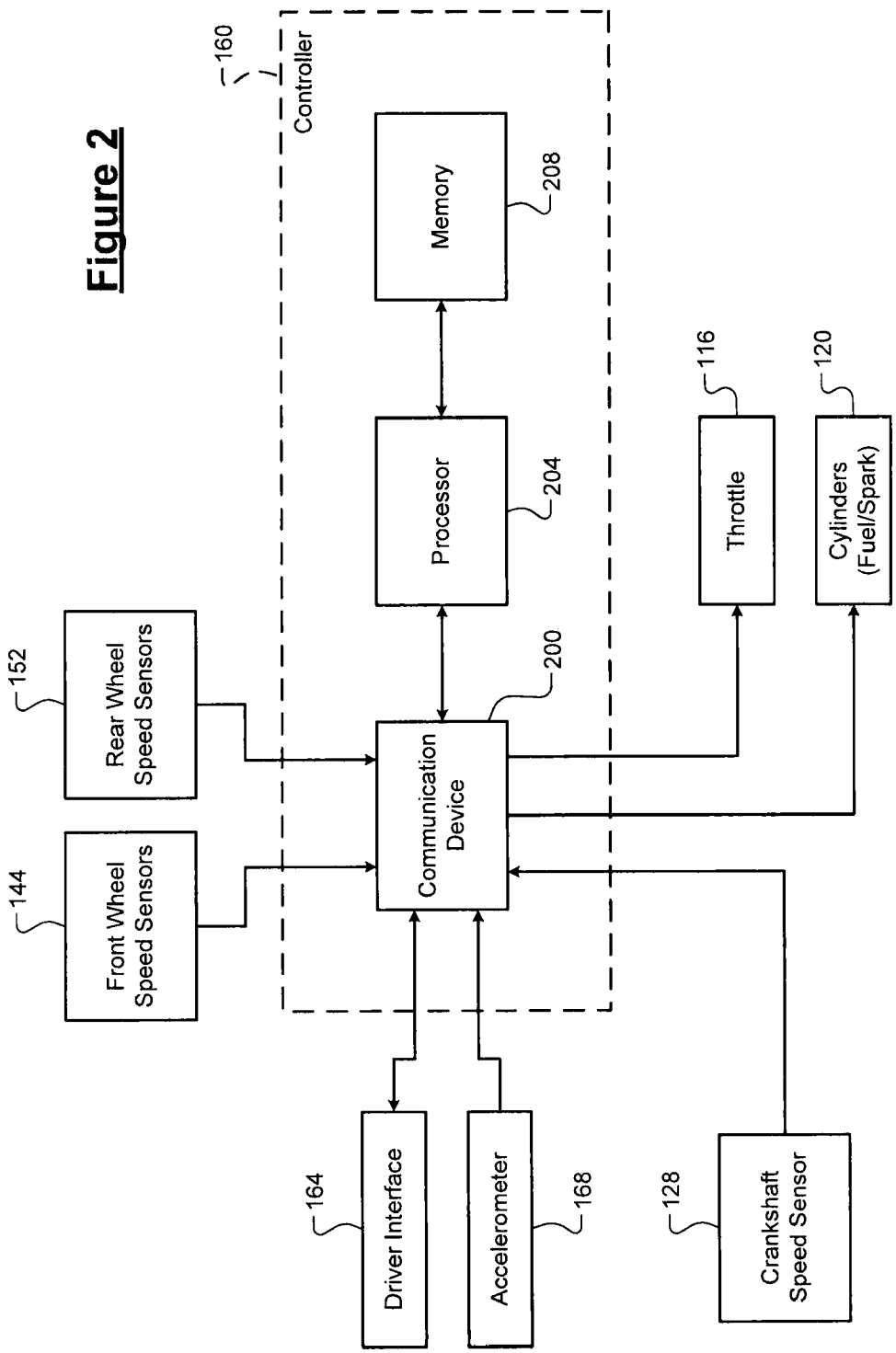
FIG. 2 is a functional block diagram of a controller of the vehicle according to the principles of the present disclosure.

Referring now to FIG. 2, a functional block diagram of the controller 160 is illustrated. The controller 160 can include a communication device 200, a processor 204, and a memory 208. The communication device 200 can include any suitable components for communication via a controller area network (CAN). As illustrated, the communication device 200 can communicate via the CAN with the throttle 116, the cylinders 120 (fuel/spark control), the crankshaft speed sensor 128, the front wheel speed sensors 144, the rear wheel speed sensors 152, the driver interface 164, and the accelerometer 168.

The processor 204 can control operation of the controller 160. Specifically, the processor 204 can perform functions including, but not limited to launching/executing an operating system of the controller 160, transmitting commands to components via the communication device 200, receiving information from components via the communication device 200, and controlling read/write operations at the memory 208. The memory 208 can be any suitable storage medium configured to store information at the controller 160 (flash, hard disk, etc.). The processor 204 can also execute at least a portion of the techniques of the present disclosure, which are described in detail below.

The processor 204 can receive signals from the front wheel speed sensors 144 and the rear wheel speed sensors 152 via the CAN and the communication device 200. These signals are indicative of the wheel speeds for each of the four wheels (front wheels 140 and rear wheels 148) of the vehicle 100. The processor 204 can calculate an average of the front wheel speed signals and the rear wheels speed signals to obtain an average front wheel speed signal and an average rear wheel speed signal. The average of the front wheel speed signals can also be referred to as an average front wheel speed and, similarly, the average of the rear wheel speed signals can also be referred to as an average rear wheel speed.

In some implementations, the processor 204 can validate the wheel speed signals from the front wheel speed sensors 144 and the rear wheel speed sensors 152. More specifically, the processor 204 can determine whether the wheel speed signals are both (i) accurate and (ii) have been generated by the front wheel speed sensors 144 and the rear wheel speed sensors 152 within a previous predetermined period. The accuracy can be determined by comparing each wheel speed signal to the other wheel speed signals or to another speed parameter, e.g., a speed of an output shaft of the transmission 132. The other validation is whether the signals are stale, e.g., due to delay on the CAN. The wheel speed signals can be validated as up-to-date based on a corresponding measurement time for each of the signals.

In some implementations, the processor 204 can also scale the wheel speed signals to obtain modified wheel speed signals having an increased resolution. The desired/maximum resolution for the modified wheel speed signals may vary based on a type of each wheel speed signal (revolutions per minute, miles per hour, kilometers per hour, etc.). The processor 204 can calculate a difference between the average of the front (modified) wheel speed signals and the average of the rear (modified) wheel speed signals to obtain an error. The error represents a difference at which the front wheels 140 and the rear wheels 148 are rotating, because all four of the wheels should be rotating at a same speed on a smooth surface.

In some implementations, the processor 204 may perform additional processing of the error to obtain a final error. First, the processor 204 may calculate an absolute value of the error to obtain a modified error. The processor 204 may then apply an adjustable gain to the modified error to obtain a first adjusted error. While one adjustable gain is discussed, it should be appreciated that more than one adjustable gain may be applied, e.g., one adjustable gain for sensitivity and another adjustable gain for throttle transient. For example, the adjustable gain(s) can vary depending on a type of the vehicle 100.

Continuing with the additional processing, the processor 204 may then apply a low-pass filter to the first adjusted error to obtain a filtered error. The processor 204 may then adjust the filtered error to compensate for any offset between (i) the front (modified) wheel speed signals and (ii) the rear (modified) wheel speed signals to obtain a second adjusted error. For example, the offset between the signals may be due to fast acceleration of the vehicle 100 and/or turning of the vehicle 100. Lastly, the processor 204 may apply the cube law to the second adjusted error to further differentiate between distributions and thereby obtain the final error.

The processor 204 can set a rough road detection bit when the (final) error is greater than or equal to a threshold indicative of an error corresponding to rough road. For example, the threshold may be predetermined and stored at the memory 208. It should be appreciated, however, that the threshold may be different depending on the type of vehicle 100 and/or various operating conditions. The rough road detection bit represents a binary bit (a flag, a signal, etc.) that indicates that the vehicle 100 is traveling on rough road ("1") or the vehicle 100 is not traveling on rough road ("0"). It should be appreciated that another suitable indicator for rough road could also be implemented.

In some implementations, the processor 204 may monitor the rough road detection bit for a period to obtain a hysteresis band. The period may be a number of engine cycles, e.g., five engine cycles. The hysteresis band can be utilized to control the transient response to the misfire detection bit. For example, the hysteresis band may be utilized to control sensitivity to the misfire detection bit. In other words, the processor 204 may monitor the rough road detection bit for the period to determine whether the misfire detection bit remains set in order to verify the initial setting of the misfire detection bit. For example, the hysteresis may be a count-up/count-down hysteresis in which a counter is increased/decreased depending on the value of the misfire detection bit. The transient response may be controlled by adjusting a rate at which the counter is increased/decreased. In this example, the threshold could be a count threshold.

The processor 204 can then determine whether the vehicle is traveling on rough road based on the hysteresis band. For the count-up/count-down hysteresis described above, the processor 204 could determine that the vehicle 100 is traveling on rough road when the count, i.e., the number of times the rough road detection bit was set during the period, is greater than or equal to the count threshold. Similarly, the processor 204 could determine that the vehicle 100 is not traveling on rough road when the count is less than the count threshold. It should be appreciated that the determination of whether the vehicle 100 is traveling on rough road could be similarly applied to other types of hysteresis.

The processor 204 can also initiate a timer when rough road is detected. This timer can be referred to as a stuck-on timer and can continue running until rough road detection is no longer detected. When the stuck-on timer exceeds a certain threshold, however, the processor 204 can ignore the detected rough road because an error may be present in the system.

After determining whether the vehicle 100 is traveling on rough road, the controller 160 can perform various other functions, which are described in detail below.

The processor 204 can detect a possible misfire of the engine 104 of the vehicle 100 based on a rotational profile of the crankshaft 124. As previously described, the rotational profile can be based on measurements from the crankshaft speed sensor 128. The processor 204 can determine that the possible misfire of the engine 104 is not a misfire when the vehicle 100 is determined to be traveling on rough road. In other words, the possible misfire can be rejected/ignored because it was incorrectly detected due to rough road. Similarly, the processor 204 can determine that the possible misfire of the engine 104 is a misfire when the vehicle 100 is determined to not be traveling on rough road. In other words, the possible misfire can be validated as an actual misfire when rough road is not detected. When a detected misfire is validated, it can be logged, e.g., at the memory 208, and, in some cases, a misfire flag/fault can be set.

In some implementations, the processor 204 can also validate the accelerometer 168 of the vehicle 100 based on the determination of whether the vehicle 100 is traveling on rough road. For example, the processor 204 can reject/ignore measurements of the accelerometer 168 when rough road is detected to prevent incorrectly diagnosing other conditions such as engine oil aeration. In other implementations, the processor 204 can control torque output of an engine 104 of the vehicle 100 based on the hysteresis band. For example, the processor 204 can regulate/limit torque output of the engine 104 when rough road is detected to assist the driver in maintaining control of the vehicle 100. It should be appreciated that this torque control feature may be limited to scenarios in which the hysteresis band indicates more severe rough road, i.e., greater than the threshold/count threshold.

Figure 3:
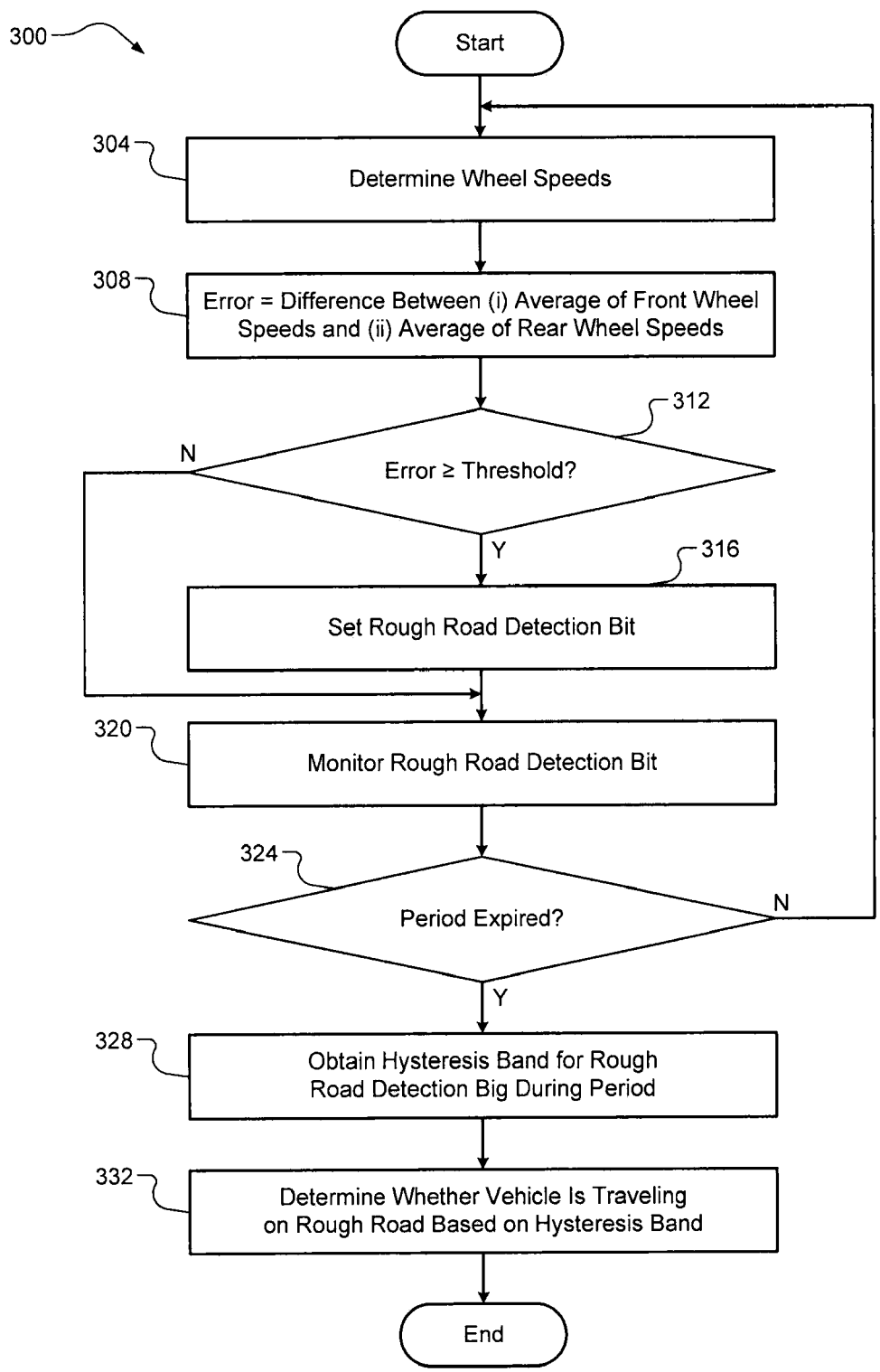
FIG. 3 is a flow diagram of a method of rough road detection according to the principles of the present disclosure.

Referring now to FIG. 3, a flow diagram of a method 300 for rough road detection is illustrated. At 304, the controller 160 can determine the wheel speeds. At 308, the controller 160 can determine a difference between (i) the front wheel speeds and (ii) the rear wheel speeds to obtain an error. At 312, the controller 160 can determine whether the error is greater than or equal to the threshold. If true, the method 300 can proceed to 316 where the rough road detection bit is set. Otherwise, the method 300 can proceed to 320 where the controller 160 can monitor the rough road detection bit. For example, monitoring of the rough road detection bit can include increasing/decreasing a counter for a count-up/count-down hysteresis.

At 324, the controller 160 can determine whether the hysteresis period has expired. If false, the method 300 can return to 304 and the monitoring to obtain the hysteresis band can continue. Otherwise, the method 300 can proceed to 328 where the controller 160 can obtain the hysteresis band based on the monitoring of the rough road detection bit during the period. For example, the hysteresis band can include a count for the count-up/count-down hysteresis. At 332, the controller 116 can determine whether the vehicle 100 is traveling on rough road based on the hysteresis band. For example, this determination can be whether the count is greater than the count threshold for the count-up/count-down hysteresis. The method 300 can then end or return to 304 for one or more additional cycles.

Figure 4:
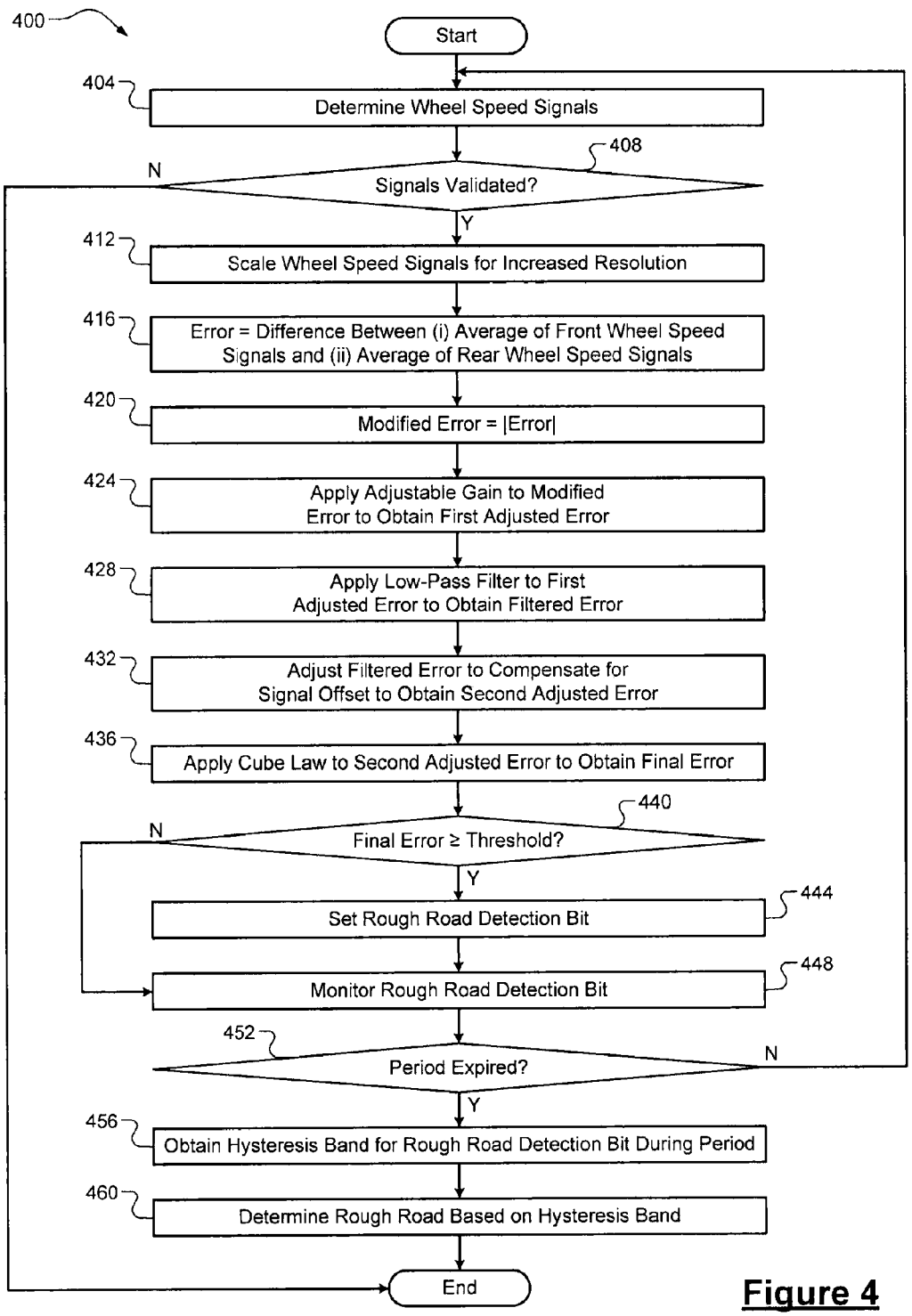
FIG. 4 is a flow diagram of another method of rough road detection according to the principles of the present disclosure.

Referring now to FIG. 4, a flow diagram of another method 400 for rough road detection is illustrated. At 404, the controller 160 can determine the wheel speed signals. At 408, the controller 160 can determine whether the signals are validated. If true, the method 400 can proceed to 412. Otherwise, the method 400 can end. At 412, the controller 160 can scale the wheel speed signals for increased resolution to obtain modified wheel speed signals. At 416, the controller 160 can determine a difference between (i) the average of the modified front wheel speed signals and (ii) the average of the modified rear wheel speed signals to obtain an error.

At 420, the controller 160 can calculate an absolute value of the error to obtain a modified error. At 424, the controller 160 can apply one or more adjustable gains to the modified error to obtain a first adjusted error. At 428, the controller 160 can apply a low-pass filter to the first adjusted error to obtain a filtered error. At 432, the controller 160 can adjust the filtered error to compensate for signal offset to obtain a second adjusted error. At 436, the controller 160 can apply the cube law to the second adjusted error to obtain a final error. At 440, the controller 160 can determine whether the final error is greater than or equal to the threshold. If true, the method 400 can proceed to 444 where the controller 160 can set the rough road detection bit. Otherwise, the method 400 can proceed to 448.

At 448, the controller 160 can monitor the rough road detection bit. At 452, the controller 160 can determine whether the hysteresis period has expired. If false, the method 400 can return to 404 and the monitoring to obtain the hysteresis band can continue. Otherwise, the method 400 can proceed to 456 where the controller 160 can obtain the hysteresis band for the rough road detection bit during the period. At 460, the controller 160 can determine whether the vehicle 100 is traveling on rough road based on the hysteresis band. The method 400 can then end or return to 404 for one or more additional cycles.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

What is claimed is:

1. A method, comprising:
    determining, at a controller of a vehicle, the controller including one or more processors, a wheel speed for each of two front wheels of the vehicle and two rear wheels of the vehicle;
    calculating, at the controller, a difference between (i) an average of the wheel speeds for the two front wheels of the vehicle and (ii) an average of the wheel speeds for the two rear wheels of the vehicle to obtain an error;
    setting, at the controller, a rough road detection bit when the error is greater than or equal to a threshold indicative of an error corresponding to rough road;
    monitoring, at the controller, the rough road detection bit for a period to obtain a hysteresis band; and
    based on the hysteresis band, determining, at the controller, whether (i) the vehicle is traveling on rough road or (ii) an engine of the vehicle has misfired.

2. The method of claim 1, further comprising receiving, at the controller, wheel speed signals from wheel speed sensors associated with the two front wheels and the two rear wheels of the vehicle via a controller area network (CAN), the wheel speed signals being indicative of the wheel speeds for each of the two front wheels and the two rear wheels of the vehicle.

3. The method of claim 2, further comprising validating, at the controller, the signals as being (i) accurate and (ii) having been generated by the wheel speed sensors within a previous predetermined period.

4. The method of claim 2, further comprising:
    scaling, at the controller, the wheel speed signals to obtain modified wheel speed signals having increased resolutions,
    wherein determining the error includes calculating a difference between (i) an average of the modified wheel speed signals for the two front wheels of the vehicle and (ii) an average of the modified wheel speed signals for the two rear wheels of the vehicle.

5. The method of claim 4, further comprising calculating, at the controller, an absolute value of the error to obtain a modified error.

6. The method of claim 5, further comprising applying, at the controller, an adjustable gain to the modified error to obtain a first adjusted error.

7. The method of claim 6, further comprising applying, at the controller, a low-pass filter to the first adjusted error to obtain a filtered error.

8. The method of claim 7, further comprising adjusting, at the controller, the filtered error to compensate for any offset in the CAN between (i) the wheel speed signals for the two front wheels and (ii) the wheel speed signals for the two rear wheels to obtain a second adjusted error.

9. The method of claim 8, further comprising applying, at the controller, the cube law to the second adjusted error to obtain a final error.

10. The method of claim 9, wherein setting the rough road detection bit includes setting, at the controller, the rough road detection bit when the final error is greater than or equal to the threshold.

11. The method of claim 1, wherein monitoring the rough road detection bit includes counting, at the controller, a number of times the rough road detection bit is set during the period.

12. The method of claim 11, wherein determining whether the vehicle is traveling on rough road includes:
    determining, at the controller, that the vehicle is traveling on rough road when the number of times the rough road detection bit was set during the period is greater than or equal to a count threshold; and
    determining, at the controller, that the vehicle is not traveling on rough road when the number of times the rough road detection bit was set during the period is less than the count threshold.

13. The method of claim 12, further comprising:
- detecting, at the controller, a possible misfire of the engine of the vehicle based on a rotational profile of a crankshaft of the engine;
- determining, at the controller, that the possible misfire of the engine is not a misfire when the vehicle is determined to be traveling on rough road; and
- determining, at the controller, that the possible misfire of the engine is a misfire when the vehicle is determined to not be traveling on rough road.

14. The method of claim 12, further comprising validating, at the controller, an accelerometer of the vehicle based on the determination of whether the vehicle is traveling on rough road.

15. The method of claim 12, further comprising controlling, by the controller, torque output of an engine of the vehicle based on the hysteresis band.

16. A method, comprising:
- determining, at a controller of a vehicle, the controller including one or more processors, signals indicative of wheel speeds for each of four wheels of the vehicle from respective wheel speed sensors, the four wheels of the vehicle including two front wheels and two rear wheels;
- validating, at the controller, the signals as being (i) accurate and (ii) having been generated by the wheel speed sensors within a previous predetermined period;
- scaling, at the controller, the signals to increase a resolution of each of the signals in response to the signals being validated;
- calculating, at the controller, a difference between (i) an average of the signals for the two front wheels of the vehicle and (ii) an average of the signals for the two rear wheels of the vehicle to obtain an error;
- calculating, at the controller, an absolute value of the error to obtain a modified error;
- applying, at the controller, an adjustable gain to the modified error to obtain a first adjusted error;
- applying, at the controller, a low-pass filter to the first adjusted error to obtain a filtered error;
- adjusting, at the controller, the filtered error to compensate for any offset between (i) the signals for the two front wheels and (ii) the signals for the two rear wheels to obtain a second adjusted error;
- applying, at the controller, the cube law to the second adjusted error to obtain a final error;
- setting, at the controller, a rough road detection bit when the final error is greater than a threshold indicative of an error corresponding to rough road;
- monitoring, at the controller, the rough road detection bit for a period to obtain a hysteresis band; and
- based on the hysteresis band, determining, at the controller, whether (i) the vehicle is traveling on rough road or (ii) an engine of the vehicle has misfired.

17. The method of claim 16, wherein monitoring the rough road detection bit includes counting, at the controller, a number of times the rough road detection bit is set during the period.

18. The method of claim 17, wherein determining whether the vehicle is traveling on rough road includes:
- determining, at the controller, that the vehicle is traveling on rough road when the number of times the rough road detection bit was set during the period is greater than or equal to a count threshold; and
- determining, at the controller, that the vehicle is not traveling on rough road when the number of times the rough road detection bit was set during the period is less than the count threshold.

19. The method of claim 17, further comprising:
- detecting, at the controller, a possible misfire of the engine of the vehicle based on a rotational profile of a crankshaft of the engine;
- determining, at the controller, that the possible misfire of the engine is not a misfire when the vehicle is determined to be traveling on rough road; and
- determining, at the controller, that the possible misfire of the engine is a misfire when the vehicle is determined to not be traveling on rough road.

20. The method of claim 17, further comprising validating, at the controller, an accelerometer of the vehicle based on the determination of whether the vehicle is traveling on rough road.

* * * * *